United States Patent
Epstein (10) Patent No.: US 6,983,239 B1
(45) Date of Patent: Jan. 3, 2006

(54) METHOD AND APPARATUS FOR EMBEDDING GRAMMARS IN A NATURAL LANGUAGE UNDERSTANDING (NLU) STATISTICAL PARSER

(75) Inventor: Mark E. Epstein, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 09/696,764

(22) Filed: Oct. 25, 2000

(51) Int. Cl.
*G06F 17/27* (2006.01)

(52) U.S. Cl. .......................... 704/9; 704/257

(58) Field of Classification Search .................. 704/1, 704/9, 10, 257
See application file for complete search history.

(56) References Cited

U.S. PATENT DOCUMENTS

| | | | | |
|---|---|---|---|---|
| 4,631,531 A | * | 12/1986 | Maeda | 345/556 |
| 4,984,178 A | * | 1/1991 | Hemphill et al. | 704/255 |
| 5,225,981 A | * | 7/1993 | Yokogawa | 704/2 |
| 5,237,689 A | * | 8/1993 | Behnke | 713/1 |
| 5,392,036 A | * | 2/1995 | Klein | 341/51 |
| 5,719,997 A | * | 2/1998 | Brown et al. | 704/257 |
| 5,754,736 A | * | 5/1998 | Aust | 704/252 |
| 6,138,098 A | * | 10/2000 | Shieber et al. | 704/257 |
| 6,182,087 B1 | * | 1/2001 | Lim | 707/204 |
| 6,278,973 B1 | * | 8/2001 | Chung et al. | 704/257 |
| 6,292,779 B1 | * | 9/2001 | Wilson et al. | 704/257 |
| 6,332,142 B1 | * | 12/2001 | LeBlanc | 707/100 |
| 6,509,707 B2 | * | 1/2003 | Yamashita et al. | 318/567 |

OTHER PUBLICATIONS

Frederick Jelinek, *Statistical Methods for Speech Recognition*, at pp. 9, 147, and 219-43 (The MIT Press).
Jurafsky and Martin, *Speech and Langauge Processing*, at p. 22 (Prentice Hall, Upper Saddler River, New Jersey).

* cited by examiner

*Primary Examiner*—W. R. Young
*Assistant Examiner*—Michael N. Opsasnick
(74) *Attorney, Agent, or Firm*—Akerman Senterfitt (57) ABSTRACT

A method and system for use in a natural language understanding system for including grammars within a statistical parser. The method involves a series of steps. The invention receives a text input. The invention applies a first context free grammar to the text input to determine substrings and corresponding parse trees, wherein the substrings and corresponding parse trees further correspond to the first context free grammar. Additionally, the invention can examine each possible substring using an inventory of queries corresponding to the CFG.

51 Claims, 3 Drawing Sheets

METHOD AND APPARATUS FOR EMBEDDING GRAMMARS IN A NATURAL LANGUAGE UNDERSTANDING (NLU) STATISTICAL PARSER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of natural language understanding, and more particularly, to including grammars within a statistical parser.

2. Description of the Related Art

Natural language understanding (NLU) systems enable computers to understand and extract information from human written or spoken language. Such systems can function in a complimentary manner with a variety of other computer applications where there exists a need to understand human language. NLU systems can extract relevant information contained within text and then supply this information to another application program or system for purposes such as booking flight reservations, finding documents, or summarizing text.

Currently within the art, NLU systems employ one of two different methods for extracting information from text strings, where a text string refers to a single sentence or other grouping of words. The first method is a linguistic approach to parsing text strings. The most common linguistic approach to NLU makes use of only a context free grammar, commonly represented within the art using Backus-Naur Form (BNF) comprising terminals and non-terminals. Terminals refer to words or other symbols which cannot be broken down any further, whereas non-terminals refer to parts of speech or phrases such as a verb phrase or a noun phrase. Thus, the grammatical approach to NLU seeks to parse each text string based on BNF grammars without the use of statistical processing. Potential ambiguities within text strings, where a terminal can be construed as belonging to more than one non-terminal, must be resolved within the grammar. For example, the NLU system can group a tag for a terminal at either the end of a previous non-terminal, or alternatively, as the start of another non-terminal.

Accordingly, to understand a text string, the NLU system requires the text string to be a priori built into the BNF grammar. In other words, the NLU system requires a BNF grammar be written that contains rules which generate the text string. The disadvantage of using a purely grammatical approach is the large amount of linguistic expertise needed write sufficient, yet unambiguous, BNF grammars. Moreover, to resolve ambiguities, the system must examine the multiple parse trees ambiguously produced by the grammar and use auxiliary information to select the correct parse. Consequently, building a grammar-based NLU system can be time consuming, inefficient, and further require experts.

Accommodating the many possible BNFs for text strings can become further complicated because particular phrases such as dates can be expressed in a variety of differing syntaxes. For example, each of the strings "Dec. 4, 2000", "Dec. 4, 2000" and "4th of December 2000" represents an equivalent date. The grammar must not only contain a grammatical representation of the text string, but also contain additional rules for each permutation of possible dates within the text string. For example, taking the text string "I want to fly on Monday, Dec. 4, 2000", many variations can be obtained by inserting a different date or by using a different date syntax. Thus, an ambiguity can arise. One example of such an ambiguity can be the NLU system interpreting the "2000" as both a time of day expressed in military time, and as the year of a date. The NLU system can never avoid all ambiguities with the proper BNF. For example, the "2000" might always be determined to be a year if immediately following a month and a day in a sentence, even though the BNF proposed that this could be a separate date and time. Notably, the grammars become increasingly complex as sentence structure becomes more intricate. Accounting for each possible permutation of well formed, or grammatically and syntactically correct, date expressions further contributes to the problem. Similar ambiguities and situations also can arise with regard to times, prices, dollar amounts, percentages, and prefix expressions such as "may I please have" or "can you give me".

The second method used by NLU systems to extract information from text strings is a statistical approach where no grammar is used in analyzing the text string. Presently such systems rely on a large corpus of annotated sentences. These annotated sentences are collected into a training corpus. One can alternatively use a Monte Carlo method to generate training sentences. Using the Monte Carlo method, the NLU system can generate many possible permutations of ambiguities, or conflicts, in order to statistically train the NLU system. From the large amount of training data, the system can build a statistical model, for example a decision tree or maximum entropy model, to analyze text strings. The analysis performed using the decision tree is not based on a grammar, but rather, a model whose behavior depends on numerical parameters whose values are learned by examining the data in a training corpus. Decision trees use a series of successive, ordered queries to determine the meaning of a sentence. For example, the system can examine a text string on a word by word basis. At each word within the text string, the system can determine the word on either side of the current word to make a determination as to the meaning of the text string. Additional examples of queries can include "what is the word two words to the left of the current word?" or "what is the word two words to the right of the current word?" Thus, the system can learn that "2000" is probably part of a date when it follows "December 4", but "2230" is probably a time. It learns this by examining the different dates and times observed in the training corpus.

Like the grammatical method, the statistical approach also has disadvantages. The first disadvantage is the time necessary to collect and annotate the training corpus. In particular, the training corpus will never contain a rich variety of dates and times. Hence one uses a Monte Carlo method to increase the amount of training data. Taking the previous example, the Monte Carlo method can generate the following text strings: "I want to fly on Tuesday, Dec. 5, 2000", "I want to fly on Wednesday, Dec. 6, 2000", and "I want to fly on Monday, Dec. 3, 2001". The method can also generate different training sentences where only the date syntax differs within each sentence. The possible permutations, each of which is likely to occur, is virtually limitless. Using this method for the number of iterations necessary to train the NLU system to recognize different date syntaxes can become inefficient and time consuming. Also, the Monte Carlo method must generate examples of the different date styles in a consistent way. For example, the Monte Carlo procedure should not generate "Dec., 4 2000" for a sentence containing a date time. Thus, using a Monte Carlo procedure can be error prone.

SUMMARY OF THE INVENTION

The invention concerns a method and a system for including grammars in a statistical computer based natural language understanding (NLU) system. The inventive method taught herein begins by receiving a text input, and applying a first context free grammar (CFG) to the text input to determine substrings and corresponding parse trees. The substrings and corresponding parse trees can correspond to the first CFG. Each substring can be examined using an inventory of queries corresponding to the first CFG. The inventory of queries can have a hierarchy determined during training of the NLU system. Additionally, each substring can be examined using one or more features. Each feature can have a corresponding weight which is determined during training of the NLU system.

In one embodiment, an inventory of queries, hierarchically ordered into a decision tree, can be used in a statistical parser. In another embodiment of the invention, a statistical maximum entropy parser can use queries related to CFGs or PCFGs. In that case, the queries can have weights rather than be ordered in a decision tree.

The system can compare a probability value corresponding to each substring to one or more threshold probability values. In that case, the first CFG can be a probabilistic CFG (PCFG). The inventory of queries can include queries corresponding to any non-terminal or terminal within the first CFG or first PCFG.

Another embodiment of the invention can include iteratively applying different CFGs using a different CFG during each iteration to determine additional substrings and corresponding parse trees relating to each different CFG applied to the text input. Further, the different CFGs can be PCFGs. Within each PCFG, a different probability value can be included for each rule.

Each substring determined by each different CFG or PCFG can be examined using the inventory of queries, which can contain queries corresponding to each different CFG or PCFG. The inventory of queries can include queries corresponding to any non-terminal or terminal within each different CFG or PCFG.

Another embodiment of the invention can be a direct channel method for determining a meaning for a text input. The method can include selectably applying a reusable CFG or PCFG to a text input. Additionally, the step of identifying one or more substrings within the text input can be included. Each substring can correspond to the reusable CFG or PCFG. The substrings further can identify the text input as a particular category of text input. The method can include determining a meaning for the text input based upon the identified substrings from possible meanings within the reusable CFG or PCFG. In the case of PCFGs, the method can include comparing a probability value corresponding to each substring to one or more threshold probability values. Further, the method can include iteratively applying different selected CFGs or PCFGs to the text input. The determining step can be applying weighted features corresponding to the substrings from the text input.

A second aspect of invention can be a system for recognizing grammatical phrases in a text input. The system of the invention can include a text buffer for storing the text input; at least one CFG for recognizing a particular grammatical phrase within the text input; and, an inventory of queries wherein each query within the inventory of queries corresponds to one CFG. The CFG can be applied to the text input in the text buffer to determine substrings and corresponding parse trees. The inventory of queries further can be applied to each substring to determine the particular grammatical phrase. Additionally, each CFG can be a PCFG which can contain a probability value corresponding to each rule also within the PCFG.

Another embodiment of the invention can be a system for recognizing grammatical phrases in a text input. The system of the invention can include a text buffer for storing the text input; at least one CFG for recognizing a particular grammatical phrase within the text input; and, one or more features such that each feature can correspond to at least one CFG. The CFG can be applied to the text input in the text buffer to determine substrings and corresponding parse trees. The features further can be applied to each substring to determine the particular grammatical phrase. Additionally, each CFG can be a PCFG which can contain a probability value corresponding to each rule also within the PCFG.

A third aspect of the invention can be a machine readable storage, having stored thereon a computer program having a plurality of code sections executable by a machine for causing the machine to perform a series of steps. The steps can include receiving a text input, and applying a first CFG to the text input to determine substrings and corresponding parse trees. The substrings and corresponding parse trees can correspond to the first CFG. The machine readable storage can cause the computer to examine each substring using an inventory of queries corresponding to the CFG. The inventory of queries can have a hierarchy determined during training of the NLU system.

Alternatively, the invention can include iteratively applying different CFGs using a different CFG during each iteration to determine additional substrings and corresponding parse trees relating to each different CFG applied to the text input. The first CFG can be a PCFG having one or more threshold probability values.

Another embodiment of the invention can be a machine readable storage, having stored thereon a computer program having a plurality of code sections executable by a machine for causing the machine to perform a series of steps. The steps can include applying a reusable CFG or PCFG to a text input, and identifying one or more substrings within the text input. Each substring can correspond to the reusable CFG or PCFG. The substrings further can identify the text input as a particular category of text input. Additionally, the method can include determining a meaning for the text input based upon the identified substrings from possible meanings within the reusable CFG or PCFG.

In the case of PCFGs, the step of comparing a probability value corresponding to each substring to one or more threshold probability values can be included. Further, machine readable storage can cause the machine to perform the step of iteratively applying different selected CFGs or PCFGs to the text input.

A fourth aspect of the invention can be a method for including grammars in a statistical parser. The inventive method taught herein begins by receiving a text input, and applying a first CFG to the text input to determine substrings and corresponding parse trees. The substrings and each corresponding parse trees can correspond to the first CFG. Each possible substring can be examined using one or more features corresponding to the first CFG. The features can have weights determined during training of the NLU system.

The system can compare a probability value corresponding to each identified substring to one or more threshold probability values. In this case, the first CFG can be a PCFG. The features can correspond to any non-terminal or terminal within the first CFG or first PCFG.

Another embodiment of the invention can include iteratively applying different CFGs or PCFGs using a different CFG or PCFG during each iteration to determine additional substrings and corresponding parse trees relating to each different CFG or PCFG applied to the text input. A different probability value can be included for each rule in each different CFG.

Each possible substring determined by each different CFG or PCFG can be examined using the features, which can correspond to each different CFG or PCFG. The features can corresponding to any non-terminal or terminal within each different CFG or PCFG.

Finally, the invention can be a machine readable storage, having stored thereon a computer program having a plurality of code sections executable by a machine for causing the machine to perform a series of steps. The steps can include receiving a text input, and applying a first CFG to the text input to determine substrings and corresponding parse trees. The substrings and corresponding parse trees can correspond to the first CFG. The machine readable storage can cause the computer to examine each substring using one or more features corresponding to the CFG. The features can have weights determined during training of the NLU system.

Alternatively, the invention can include iteratively applying different CFGs using a different CFG during each iteration to determine additional substrings and corresponding parse trees relating to each different CFG applied to the text input. The first CFG can be a PCFG having one or more threshold probability values.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method and system for including grammars within a statistical parser for use with a natural language understanding (NLU) system. The system of the invention includes parsing a text string into each possible substring using a context-free grammar (CFG). A substring can be any grouping of words, such as a date, time, percentage, or grammatical phrase such as a noun phrase, verb phrase, prepositional phrase, or entire sentence, found within a larger body of text or text string. A grammar is a formal specification of the structures allowable in a language where the rules can be denoted using Backus-Naur Form (BNF). For example, a sentence can be denoted as "S :=NP VP", where the well formed sentence "S" can consist of a noun phrase (NP) and a verb phrase (VP).

Notably, phrases and groups of phrases can be referred to as non-terminals. Accordingly, "NP" and "VP" can be referred to as non-terminals. Also, each element of the rule further can be parsed to the terminal or word level. For example, "NP :=ART N" can be a parse of a noun phrase having an article (ART) and a noun (N), such as "a boy". A grammar comprised of a system of rules having a single symbol on the left-hand side is said to be a context-free grammar. Additionally, CFGs can contain probability values such that particular rules can be assigned a probability value based on frequency. The probability value can be derived from analysis of training corpus using the maximum likelihood estimate from annotated parses, using an algorithm like the Inside/Outside algorithm discovered by Jim Baker to learn a maximum likelihood estimate from unannotated data, or alternatively, be a preprogrammed value. A CFG having probability values assigned to rules is called a probabilistic CFG (PCFG).

Notably, the process of the invention can be iterative in that a different CFG can be applied to the text string during each subsequent iteration. The system additionally can return the parse tree for each possible substring identified by a corresponding CFG. The parse tree of a text string comprises the rules of the grammar used to parse the text string to the terminal level. Rather than denoting the rules as a system of equations, the rules can be depicted in graphical form. In this form, as a parse tree, the left-hand term of the highest level rule used to identify the text string serves as the root. More detailed rules lie beneath the root, where each left-hand side of a rule serves as a node of the parse tree. Thus, the root can be "S" where the next level nodes beneath "S" are "NP" and "VP". The parse tree can continue until the terminal level is reached. Accordingly, syntax can be defined through the system of rules, where a valid syntax can be defined as a syntax within the CFG. Notably, the CFGs can be smaller, more specific grammars for particular constituents or word groupings rather than for an entire language. Such particular phrases can be referred to as substrings within a text string which serve as text inputs to the NLU system.

Each identified possible substring and parse tree can be examined using an inventory of queries. The inventory of queries can contain queries relating to each CFG applied to the text string. Queries can be directed at the terminal level or at the non-terminal level. For example, "is the current word under examination contained within a non-terminal of a particular CFG". Another example of a query can be "does the current word begin a substring in the set of parses found by the grammatical model?" Using statistical processing methods known in the art, the inventory of queries can be ordered to form a decision tree during training of the NLU system. In this manner grammars can be included into a statistical parser to significantly reduce the amount of training data and time required to properly train a NLU system. In addition, the grammar can later be changed without requiring the system to be retrained.

The NLU system can determine a hierarchy of the queries contained within the inventory of queries during training using an annotated training corpus. Using statistical processing algorithms known in the art, such as minimizing the conditional entropy or maximizing the likelihood that the resulting model predicts the training data, the NLU system can determine the most efficient and effective ordering of queries. In this manner a hierarchy of queries within the inventory of queries, referred to as a decision tree, capable of recognizing grammatical phrases, can be determined. Notably, the inventory of queries can include queries directed to a CFG, a PCFG, and to particular word and word groupings within a text string.

A positive result to one query can render another query or set of queries moot, yet other queries can become highly relevant. For example, if a word is identified as the left most constituent being built, then the NLU system need not query further to determine words further to the left within the text string. Accordingly, the NLU system, for example, can query to determine the right most word of the constituent being built. Thus, an analysis of the queries and results on the training corpus can determine the resulting decision tree. This decision tree is then used at runtime to statistically provide a probability distribution for possible parse trees.

In another embodiment, known as maximum entropy modeling, each query is called a "feature", and all features have weights, which are determined by an algorithm known as generalized iterative scaling. This assigns higher weights according to the utility of a feature. Similar to the hierarchy of queries, the weights of each feature can be determined during training of the NLU system. Specifically, analysis of the annotated training corpus with regard to the features can determine the resulting weights of the features, just as relative importance of queries can be determined. Thus, the determined weights used with the maximum entropy model can be used instead of a decision tree. The resulting model can be called a maximum entropy parser.

In another embodiment, known as direct channel modeling, the NLU system can examine an entire sentence to determine a meaning. The NLU system can check the text input for the occurrence of terminals or non-terminals within a particular CFG or PCFG indicating a general category of meaning for the text input. For example, the text input can relate to meanings corresponding to airline flight information. Thus, out of several general categories of text inputs, the NLU system can recognize the text input as pertaining to flight information, rather than hotel or rental car information. Consequently, the NLU system can query for the presence of more specific arguments, such as times and locations, which relate to flight information which are within the CFG or PCFG. By identifying non-terminals and terminals moving from the general to the more specific, the NLU system searches for a meaning of the English sentence, rather than searching for the presence of all terminals and non-terminals of a CFG within a text input. In this manner, the NLU system directly determines a meaning for the text input without statistically parsing the sentence.

It should be appreciated that a category of text input can be any type of text input expected by an NLU system, and the invention is not so limited by the specific examples described herein. For example, a NLU system for use with a travel agency can recognize categories by vacation type, i.e., a cruise, land tour, or biking tour. An NLU system used with an airline can recognize air travel as a category and booking rental cars as a separate category.

Figure 1:
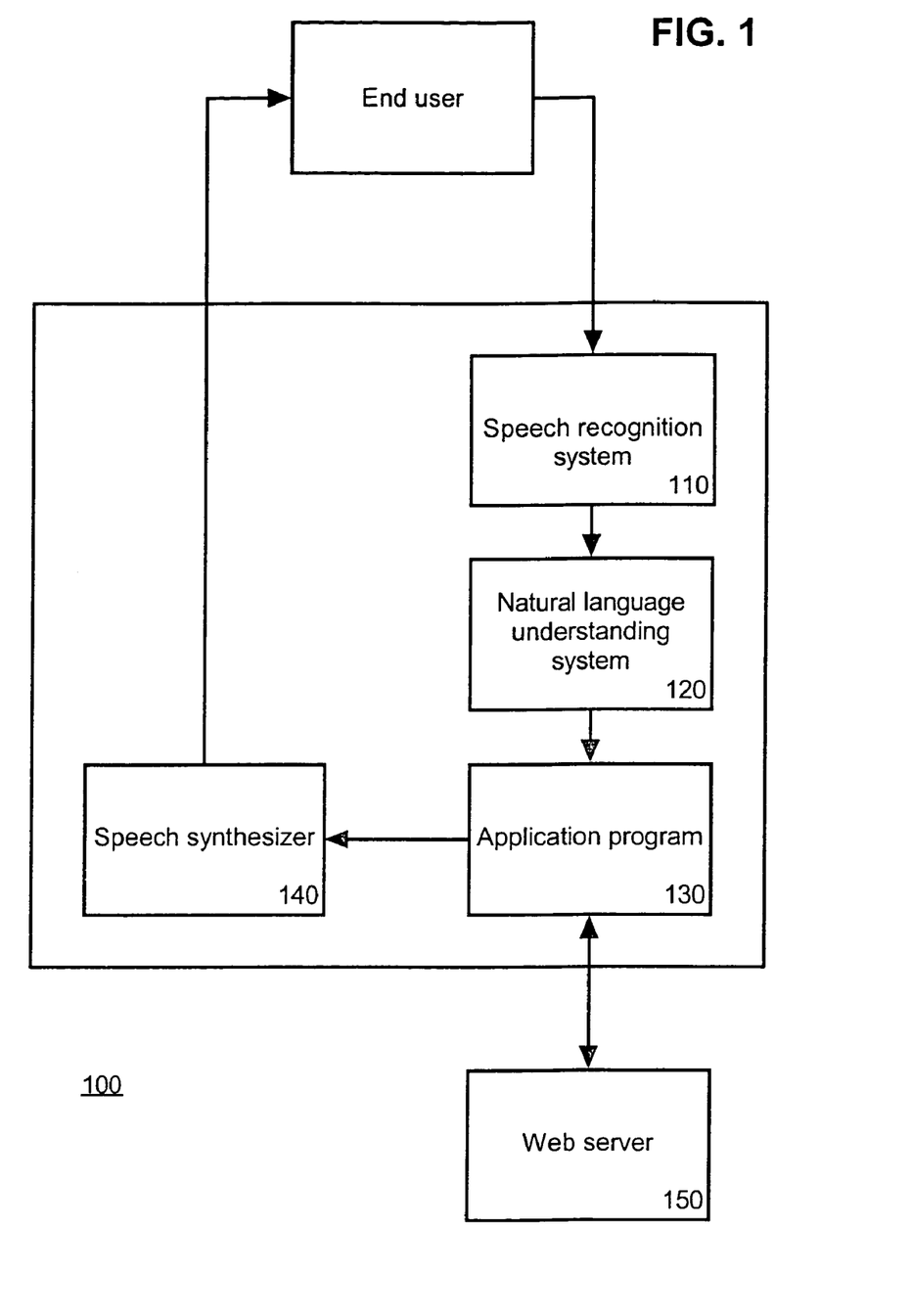
FIG. 1 depicts an exemplary configuration utilizing the system of the invention.

FIG. 1 depicts an exemplary system 100 containing speech recognition system (SRS) 110, NLU system 120, application program 130, speech synthesizer 140, and optionally a web server 150 for implementation on the Internet or other computer communications network. System 100 can be any system which requires an understanding of, or an extraction of information from human language. Examples of such systems can include, but are not limited to, automated reservation systems and automated help desks. Notably, NLU system 120 functions as an element of system 100.

In exemplary system 100, speech recognition system (SRS) 110, NLU system 120, application program 130, and speech synthesizer 140 can be computer programs written in C or another suitable programming language. The computer programs can be contained within a computer system equipped with the necessary hardware, i.e., audio circuitry (sound card) and modem, to perform speech recognition and speech synthesis functions. The various hardware requirements for the computer system as described herein can generally be satisfied by any one of many commercially available high speed multimedia personal computers offered by manufacturers such as International Business Machines Corporation.

In operation, an end user can initiate a communications session with system 100 through a conventional communications link. More specifically, the communications link can be a data connection through a computer communications network, the Internet, or a voice connection via telephone. For example, with the latter instance, the end user can contact system 100 by dialing a service telephone number and initiating voice communication with system 100. In response, system 100 can answer the end user's telephone call and provide service options through a prerecorded message or through speech synthesizer 140. For example, system 100 can instruct the end user as follows: "Say 'customer service' to speak with a service agent, say 'reservations' to make flight reservations."

Subsequently, the end user makes a selection by uttering into a telephone handset the appropriate phrase corresponding to the end user's desired selection. User spoken utterances delivered to system 100 through the telephone connection can be received by speech recognition system (SRS) 110 and converted to computer-recognizable text for further processing. SRSs are well known in the art and are commercially available from manufacturers such as International Business Machines Corporation.

Once a user spoken utterance has been converted to text by the SRS 110, the SRS can further provide the resulting text representation of the user spoken utterance to the NLU system 120 as a text input. From the text representation of the user spoken utterance, the NLU system 120 can process the received text to extract information required by application program 130. For example, required information within a flight reservation system can be text or phrases, including both noun and verb phrases, indicating a desire to fly, the destination, and arrival and departure dates and times.

NLU system 120 can include one or more CFGs as is commonly known in the art, which can be represented in BNF for parsing text strings and identifying possible substrings by the sentential level non-terminal of the CFG. For example, the sentential level non-terminal can be the most general rule used to identify a text string within a parse tree. As applied to an entire sentence, the sentential level non-terminal can be a BNF corresponding to the grammatical structure of the entire sentence. Notably, the CFGs can be smaller, more specific grammars for particular constituents or word groupings rather than for an entire language. For example, the NLU system can contain individual grammars for dates, times, prices, dollar amounts, percentages, subphrases such as "can I have" or "please pass me", and other expressions. Accordingly, the sentential level non-terminal for a date can represent one of a variety of different date syntaxes such as "<MONTH>, <DAY> of <YEAR>".

Following the extraction of the information by the NLU system 120, the NLU system 120 can provide the information to the application program 130. Subsequently, the application program 130 can make use of the information as required. Specifically, after determining whether the user requested information is available or whether the user requested function can be performed, the application program 130 can provide feedback information to the end user through speech synthesizer 140 via telephone.

Figure 2:
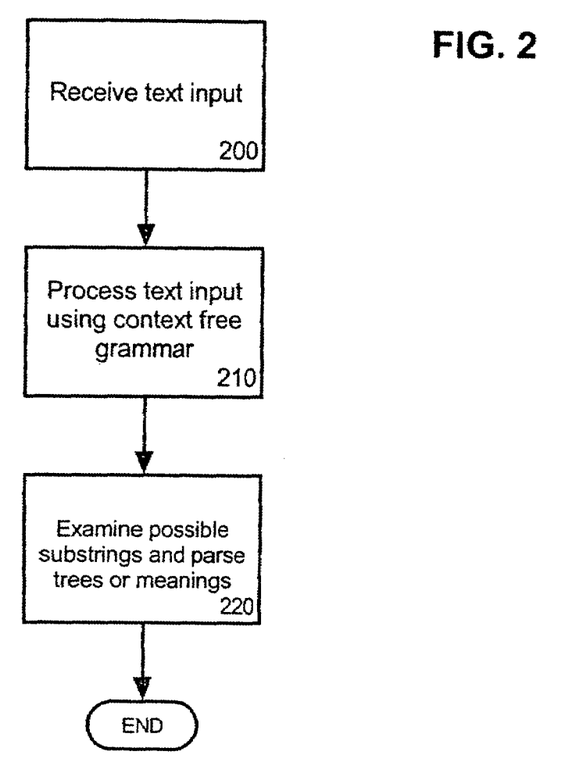
FIG. 2 is a flow chart illustrating a process for parsing text.

FIG. 2 is a flow chart illustrating a process for including CFGs into a statistical or maximum entropy parser as performed by the NLU system 120 of FIG. 1. According to one embodiment of the invention, the NLU system is placed in a mode awaiting a text input from an end user for processing. Beginning at step 200, the NLU system receives a text input for processing.

In step 210, the NLU system processes the text input using a CFG. Using the CFG, the processing returns each possible substring parsed by the sentential level non-terminal of the grammar. For example, the processing can identify word groupings, or subphrases, within a body of text which correspond to defined grammatical expressions within the CFG. Accordingly, within the text string "I want Monday, January 5th please", the processing can return the following substrings as valid date syntaxes: "Monday", "Monday, January 5th", "January", and "January 5th". This result can be obtained by using a CFG having valid date rule entries for: <DAY OF THE WEEK>, <DAY OF THE WEEK, MONTH DATE>, <MONTH>, and <MONTH, DATE>. Processing methods can include, but are not limited to, a chart parser or a finite state parser.

It should be appreciated that an NLU system can contain different CFGs, each tailored to a specific expression. For example, the NLU system can include a CFG directed to the representation of time in addition to dates. Such a CFG can contain BNF representations enabling the NLU system to recognize various syntaxes expressing time. More specifically, the grammar can recognize each of the following examples as times, though the syntax of each is different: "10:15 p.m.", "15 after 10", "a quarter past 10", and "15 minutes after 10 in the evening".

Taking another example, the NLU system can return several possible substrings when applying a date CFG to the input text "I want to fly the 4th of December in 2001". One possible substring from the text input can be "4th of December", where the "2001" is interpreted as the time of a desired flight on December 4 expressed in military time. Another possible substring can be "December in 2001", where the "4th" is interpreted as belonging with another constituent or substring, but not the date. Still another interpretation can be the correct user intended interpretation, "4th of December in 2001". Thus, the exemplary processing can yield each possible substring derived from applying the CFG to the input text. In other words, by applying a date CFG to the input text, the NLU system can extract each possible substring of text representing dates. In addition to extracting each possible substring corresponding to the type of CFG applied, the processing also can return each substring's corresponding parse tree.

It should be appreciated that the same technique of using specifically tailored CFGs can be used to extract other expressions such as time, price, dollar amounts, percentages, and prefix expressions. Thus, the NLU system can undergo multiple iterations, applying a different CFG during each subsequent iteration. For example, by applying a CFG for extracting time substrings, each possible time substring within the input text can be extracted. A subsequent iteration can apply a percentage directed CFG to extract each possible percentage substring. After completion of step 210, the system can continue to step 220.

In step 220, the resulting substrings and parse trees can be examined using an inventory of queries relating to the particular CFG used to extract each substring. In the case of a maximum entropy parser, the queries can be referred to as features, where the features have weights rather than being ordered into a decision tree. The hierarchy of queries, and weights of the features, determined during training, can be used to determine the probability of a specific tag, label, or extension in a proposed parse tree. The queries and features can be directed at non-terminals such as verb phrases or other clauses. Also, the queries and features can be directed at terminals within non-terminals. In this case, the examination can proceed on a word by word basis.

Examples can include:

Does the current word begin a substring parsable by this grammar?

Does the current word continue a substring parsable by this grammar and continue the open constituent already started?

Does the current word continue a substring parsable by this grammar and close the open constituent already started?

Does the current constituent just created continue the current open constituent?

Notably, the exemplary queries not only can be directed to the CFG or PCFG, but can be more general. For example, the NLU system can query as to what words are immediately to the left or right of a particular word. Additionally, the NLU system can ask what word is one word to the left or right of a particular word. For example, by applying queries to the identified substring "December of 2001", the NLU system can determine that the string is represented by a valid syntax within the CFG. However, by subsequently querying to find what terminals and non-terminals also exist within the text input, along with their corresponding placement, the NLU system can determine that "4th of" is part of the date substring. Consequently, the NLU system can continue to apply queries from the inventory of queries to arrive at another valid syntax within the CFG representing "4th of December in 2001", the syntax actually intended by the end user. Notably, the queries can be applied on a word by word basis, or a phrase by phrase basis.

It should further be appreciated that queries within the inventory of queries need not be limited to whether a given non-terminal or terminal begins or ends a rule for a valid syntax. Rather queries can also determine whether a non-terminal or terminal can be located within a particular syntax. Additionally, the queries can be directed at the placement of a terminal or non-terminal within a rule for a valid syntax. For example, the NLU system can query not only whether "December" can be found within a valid syntax rule, but also determine the location of "December" within a valid syntax of the date CFG. The answer to each query can be stored as a 1 or 0 bit within memory for future statistical processing.

In an embodiment where the NLU system uses a maximum entropy model, each query, referred to as a feature, can be assigned a weight through examination of a training corpus. A sentence can be examined for the presence of particular features. Text strings identified as having particular features, for example containing a number or beginning or ending with a particular word, can be scored. The weights of the features present in the text string can be multiplied together to yield an overall score. Thus, rather than using a hierarchy of queries where some queries are of greater significance in a decision tree format, the NLU system can detect features having larger weights prior to detecting lesser weighted features. Specifically, the weights of features can correspond to the importance of a query. Notably, the weights, and thus the ordering of the detection of features, can be determined during training using the annotated training corpus. It should be appreciated that each method, using a hierarchy of queries or features in a maximum entropy model, can statistically provide a probability distribution for possible parse trees at runtime.

Further, because rules within a particular CFG can be assigned probability values, making the CFG a PCFG, the queries or features in the NLU system can be instructed to return only substrings corresponding to rules having a probability value greater than a threshold probability value. For example, the threshold probability value can be a predetermined value programmed within the NLU system, a value set by a systems administrator, or alternatively, a value set by the NLU system during training. Regardless of the method used to set the threshold probability value, the threshold probability value subsequently can be adjusted within the NLU system. In the case where different PCFGs can be iteratively applied to a text input, each different PCFG can contain a corresponding threshold probability value. Thus, PCFGs further can be customized in this manner. Notably, the threshold probability values can be set and subsequently altered as previously discussed. Using a PCFG, the probability of any specific parse tree can be computed, and hence the probability that in a specific sentence, a particular word begins, ends, or is any part of a specific non-terminal in the PCFG. Further, the system can have multiple probability threshold values such that the NLU system can search for substrings corresponding to a probability value falling within a particular range of threshold probability values.

Notably, the method of the invention disclosed herein requires a significantly smaller amount of training data to train an NLU system than other known methods. Accordingly, a smaller amount of training data can be annotated. Further, the invention does not employ the Monte Carlo method. Using a well designed inventory of queries or features, a grammar, and a minimal amount of training data, a statistical parser can learn at training time which combination of queries or weighted features is most effective for statistical models to learn grammatical phrases within a text string.

Figure 3:
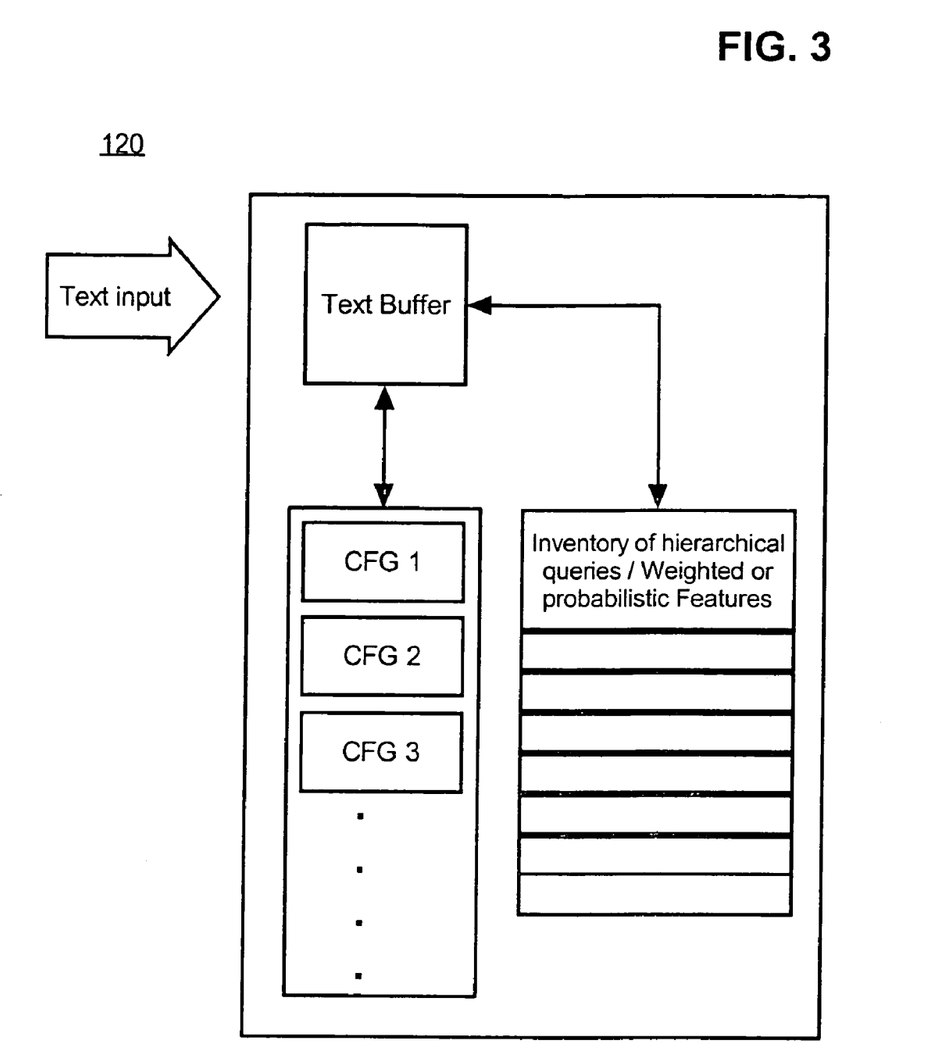
FIG. 3 is a schematic illustrating an exemplary system for recognizing text phrases within a text input.

FIG. 3 is a schematic illustrating an exemplary system for recognizing text phrases within a text input, as can be performed by NLU system 120 in FIG. 1. NLU system 120 can include a text buffer for receiving a text input to be processed. NLU system 120 also can include one or more CFGs, as previously described, each capable of recognizing particular substrings, such as dates, times, percentages, dollar amounts, prices, and subphrases, within a body of text. The CFGs can be PCFGs. Also included can be an inventory of queries. The queries contained within the inventory of queries can correspond to one or more of the CFGs or PCFGs within NLU system 120. In the case where the NLU system utilizes the maximum entropy model, the inventory of queries can be replaced with weighted features, which can correspond to one or more CFGs or PCFGs within the NLU system 120.

The present invention can be realized in hardware, software, or a combination of hardware and software. A method and system for including CFGs within a statistical parser according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. In a natural language understanding (NLU) system, a method for including grammars in a statistical parser comprising:
   receiving a text input; and,
   applying a first context free grammar (CFG) to said text input to determine substrings and corresponding parse trees, wherein said substrings and said corresponding parse trees further correspond to said first CFG; and,
   examining each said possible substring and corresponding parse tree using an inventory of ordered grammar-related queries corresponding to said CFG, wherein said queries are ordered training of the NLU system to form a decision tree, the ordering of the queries being a statistical ordering based on a minimization of conditional entropy or maximization of a likelihood that a resulting model predicts data used to train the NLU system.

2. The method of claim 1, wherein said inventory of queries further includes:
   queries corresponding to a non-terminal within said first CFG.

3. The method of claim 1, wherein said inventory of queries further includes:
   queries corresponding to a terminal within said first CFG.

4. The method of claim 1, wherein said inventory of queries has a hierarchy determined during training of the NLU system.

5. The method of claim 1, further comprising iteratively applying different CFGs using a different CFG during each iteration to determine additional substrings and corresponding parse trees relating to each said different CFG applied to said text input.

6. The method of claim 5, further comprising the step of:
   examining each said additional substring determined by each said different CFG using said inventory of queries wherein said inventory of queries contains queries corresponding to each said different CFG.

7. The method of claim 6, wherein said inventory of queries further includes:
   queries corresponding to a non-terminal within each said different CFG.

8. The method of claim 6, wherein said inventory of queries further includes:
   queries corresponding to a terminal within each said different CFG.

9. The method of claim 1, further comprising:
   comparing a probability value corresponding to each said substring to one or more threshold probability values, wherein said first CFG is a probabilistic CFG (PCFG).

10. The method of claim 9, wherein said inventory of queries further includes:
   queries corresponding to a non-terminal within said first PCFG.

11. The method of claim 9, wherein said inventory of queries further includes:
   queries corresponding to a terminal within said first PCFG.

12. The method of claim 9, further comprising iteratively applying different PCFGs using a different PCFG during each iteration to determine additional substrings and corresponding parse trees relating to each said different PCFG applied to said text input.

13. The method of claim 12, further comprising the step of:
   examining each said additional substring determined by each said different PCFG using said inventory of queries wherein said inventory of queries contains queries corresponding to each said different PCFG.

14. The method of claim 13, wherein said inventory of queries further includes:
   queries corresponding to a non-terminal within each said different PCFG.

15. The method of claim 13, wherein said inventory of queries further includes:
   queries corresponding to a terminal within each said different PCFG.

16. A system for recognizing grammatical phrases in a text input comprising:
   a text buffer for storing said text input;
   at least one context-free grammar (CFG) for recognizing a particular grammatical phrase within said text input; and,
   an inventory of ordered grammar-related queries wherein each query within said inventory of queries corresponds to said at least one CFG;
   wherein said queries are ordered during training of a corresponding natural language understanding (NLU) system to form a decision tree, the ordering of the queries being a statistical ordering based on a minimization of conditional entropy or maximization of a likelihood that a resulting model predicts data used to train the NLU system;
   wherein said at least one CFG is applied to said text input in said text buffer to determine substrings and corresponding parse trees;
   wherein said inventory of queries is further applied to said substrings to determine said particular grammatical phrase.

17. The system of claim 16, wherein said at least one CFG is a probabilistic CFG (PCFG) containing a probability value corresponding to each rule also within said at least one PCFG.

18. A system for recognizing grammatical phrases in a text input comprising:
   a text buffer for storing said text input;
   at least one context-free grammar (CFG) for recognizing a particular grammatical phrase within said text input; and,
   one or more weighted grammar-related features wherein each said feature corresponds to said at least one CFG;
   wherein each said feature is weighted during training of a corresponding natural language understanding (NLU) system, each weight being determined based on a maximum entropy model;
   wherein said at least one CFG is applied to said text input in said text buffer to determine substrings and corresponding parse trees;
   wherein said features are further applied to said substrings to determine said particular grammatical phrase.

19. The system of claim 18, wherein said at least one CFG is a probabilistic CFG (PCFG) containing a probability value corresponding to each rule also within said at least one PCFG.

20. A machine readable storage, having stored thereon a computer program having a plurality of code sections executable by a machine for causing the machine to perform the steps of:
   receiving a text input;
   applying a first context free grammar (CFG) to said text input to determine substrings and corresponding parse trees, wherein said substrings and said corresponding parse trees further correspond to said first CFG; and,
   examining each said possible substring and corresponding parse tree using an inventory of ordered grammar-related queries corresponding to said CFG, wherein said queries are ordered during training of the NLU system to form a decision tree, the ordering of the queries being a statistical ordering based on a minimization of conditional entropy or maximization of a likelihood that a resulting model predicts data used to train a corresponding NLU system.

21. The machine readable storage of claim 20, further comprising iteratively applying different CFGs using a different CFG during each iteration to determine each possible substring and corresponding parse tree relating to each said different CFG applied to said text input.

22. The machine readable storage of claim 20, wherein said first CFG is a probabilistic CFG (PCFG) having one or more threshold probability values.

23. The machine readable storage of claim 20, said inventory of queries having a hierarchy determined during training of said NLU system.

24. In a natural language understanding (NLU) system, a method for including grammars in a statistical parser comprising:
   receiving a text input; and,
   applying a first context free grammar (CFG) to said text input to determine substrings and corresponding parse trees, wherein said substrings and said corresponding parse trees further correspond to said first CFG; and,
   examining each said possible substring and corresponding parse tree using one or more weighted grammar-related features corresponding to said CFG, wherein each said feature is weighted during training of said NLU system, each weight being determined based on a maximum entropy model.

25. The method of claim 24, wherein said inventory of queries further includes:
   features corresponding to a non-terminal within said first CFG.

26. The method of claim 24, wherein said inventory of queries further includes:
   features corresponding to a terminal within said first CFG.

27. The method of claim 24, wherein each weight determined during training of said NLU system is determined based on a generalized iterative scaling algorithm.

28. The method of claim 24, further comprising iteratively applying different CFGs using a different CFG during each iteration to determine additional substrings and corresponding parse trees relating to each said different CFG applied to said text input.

29. The method of claim 28, further comprising the step of:
   examining each said additional substring determined by each said different CFG using said features, wherein said features further correspond to each said different CFG.

30. The method of claim 29, wherein said features further include:
   features corresponding to a non-terminal within each said different CFG.

31. The method of claim 29, wherein said features further include:
   features corresponding to a terminal within each said different CFG.

32. The method of claim 24, further comprising comparing a probability value corresponding to each said substring to one or more threshold probability values, wherein said first CFG is a probabilistic CFG (PCFG).

33. The method of claim 32, wherein said features further include:
   features corresponding to a non-terminal within said first PCFG.

34. The method of claim 32, wherein said features further include:
   features corresponding to a terminal within said first PCFG.

35. The method of claim 32, further comprising iteratively applying different PCFGs using a different PCFG during each iteration to determine additional substrings and corresponding parse trees relating to each said different PCFG applied to said text input.

36. The method of claim 35, further comprising the step of:
   examining each said additional substring determined by each said different PCFG using said features, wherein said features further correspond to each said different PCFG.

37. The method of claim 36, wherein said features farther include:
   features corresponding to a non-terminal within each said different PCFG.

38. The method of claim 36, wherein said features further include:
   features corresponding to a terminal within each said different PCFG.

39. A machine readable storage, having stored thereon a computer program having a plurality of code sections executable by a machine for causing the machine to perform the steps of:
   receiving a text input;
   applying a first context free grammar (CFG) to said text input to determine substrings and corresponding parse trees, wherein said substrings and said corresponding parse trees further correspond to said first CFG; and,
   examining each said possible substring and corresponding parse tree using one or more weighted grammar-related features corresponding to said CFG, wherein each said feature is weighted during training of a corresponding natural language understanding (NLU) system, each weight being determined based on a maximum entropy model.

40. The machine readable storage of claim 39, further comprising iteratively applying different CFGs using a different CFG during each iteration to determine additional substrings and corresponding parse trees relating to each said different CFG applied to said text input.

41. The machine readable storage of claim 39, wherein said first CFG is a probabilistic CFG (PCFG) having one or more threshold probability values.

42. The machine readable storage of claim 39, wherein each said weight determined during training of NLU system is determined based on a generalized iterative scaling algorithm.

43. In a natural language understanding (NLU) system, a direct channel method for determining a meaning for a text input comprising:
   selectably applying a reusable context free grammar (CFG) to a text input;
   identifying one or more substrings within said text input, each said substring corresponding to said reusable CFG;
   examining each said possible substring and corresponding parse tree using an inventory of ordered grammar-related queries and a set of features corresponding to said CFG, wherein said queries are ordered during training of the NLU system to form a decision tree, the ordering of the queries being a statistical ordering based on a minimization of conditional entropy or maximization of a likelihood that a resulting model predicts data used to train the NLU system; and,
   determining a meaning for said text input based upon said identified substrings from possible meanings within said reusable CFG.

44. The method of claim 43, said determining step comprising:
   applying features having weights corresponding to said substrings to said text input.

45. The method of claim 43, further comprising:
   comparing a probability value corresponding to each said substring to one or more threshold probability values, wherein said first reusable CFG is a reusable probabilistic CFG (PCFG).

46. The method of claim 43, further comprising iteratively applying different selected CFGs to said text input.

47. The method of claim 46, further comprising iteratively applying different selected PCFGs to said text input.

48. A machine readable storage, having stored thereon a computer program having a plurality of code sections executable by a machine for causing the machine to perform the steps of:
   selectably applying a reusable context free grammar (CFG) to a text input;
   identifying one or more substrings within said text input, said substrings corresponding to said reusable CFG;
   examining each said substring using at least one of an inventory of grammar-related queries and a set of features corresponding to said CFG, wherein said queries are ordered during training of a corresponding natural language understanding (NLU) system to form a decision tree, the ordering of the queries being a statistical ordering based on a minimization of conditional entropy or maximization of a likelihood that a resulting model predicts data used to train the NLU system; and,
   determining a meaning for said text input based upon said identified substrings from possible meanings within said reusable CFG.

49. The machine readable storage of claim 48, further comprising iteratively applying different selected CFGs to said text input.

50. The machine readable storage of claim 48, further comprising:
   comparing a probability value corresponding to each said substring to one or more threshold probability values, wherein said first reusable CFG is a reusable probabilistic CFG (PCFG).

51. The machine readable storage of claim 50, further comprising iteratively applying different selected PCFGs to said text input.

* * * * *